UNITED STATES PATENT OFFICE.

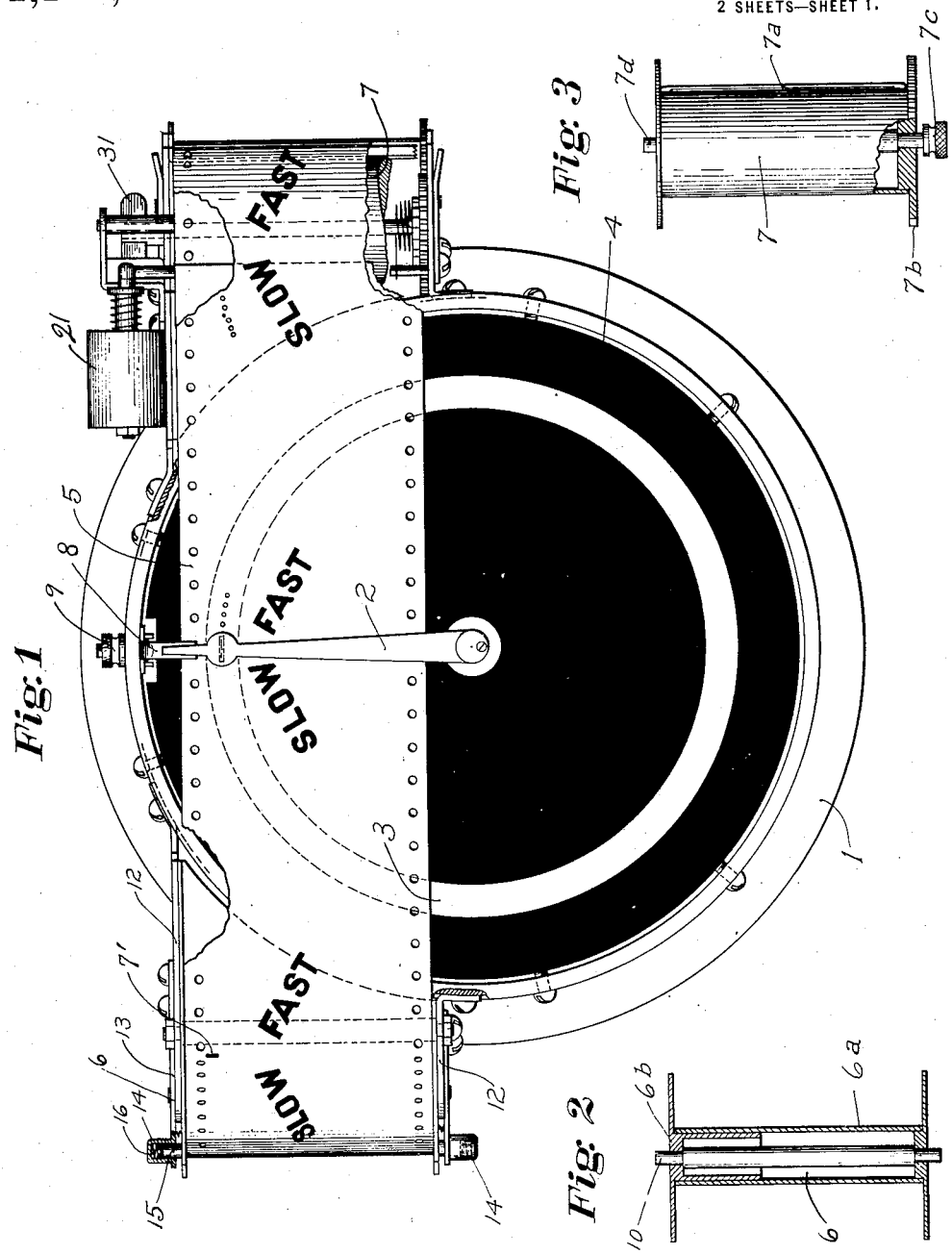

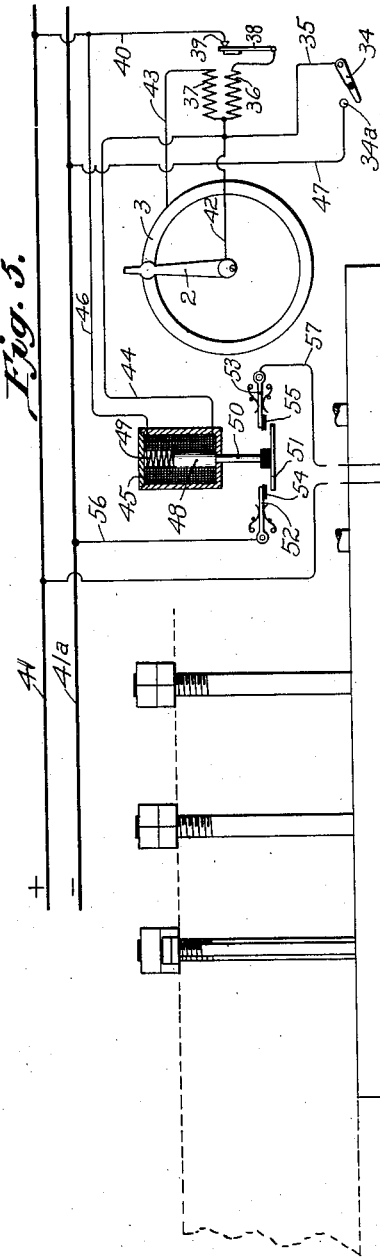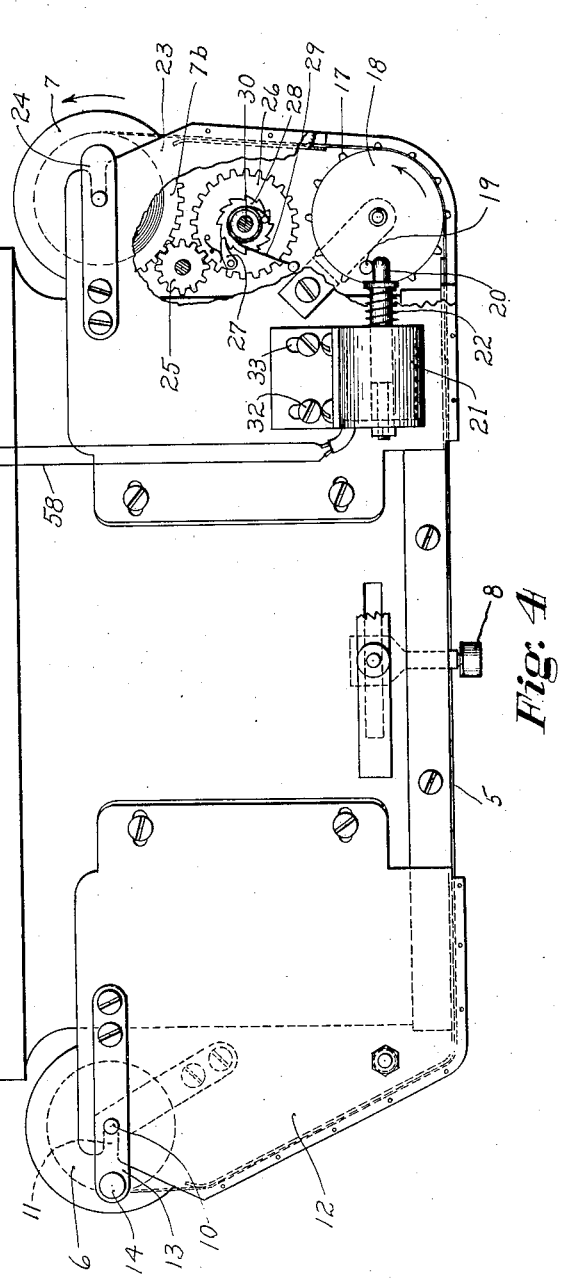

EDMUND O. SCHWEITZER, OF CHICAGO, ILLINOIS.

SYNCHRONIZING RECORDER.

1,155,106.  Specification of Letters Patent.  Patented Sept. 28, 1915.

Application filed August 12, 1911. Serial No. 643,709.

*To all whom it may concern:*

Be it known that I, EDMUND O. SCHWEITZER, a citizen of the United States, residing at Chicago, in the county of Cook and State of Illinois, have invented a certain new and useful Improvement in Synchronizing Recorders, of which the following is a full, clear, concise, and exact specification, reference being had to the accompanying drawings, forming a part of this specification.

The object of my invention is to provide an improved construction for recording the operation of synchronizing alternating current generators and motors.

The present invention is an improvement upon the invention disclosed in a co-pending application of mine, in which the phase relation of the electromotive forces of the machines being coupled together is automatically recorded by said act of coupling them together.

The present application has for its object the provision of mechanism for bringing into proper position successive record-receiving means, so that the operator may, if desired, be entirely relieved of the necessity of placing a new record disk or sheet in the instrument for each operation of the coupling devices. By my present invention I preferably provide a continuous record strip which may be advanced either automatically or manually after each operation of the synchronizing device so as to remove the record made by the synchronizing operation and properly place the record strip in position to receive a subsequent record. The differences in the phase relation of the two machines connected is indicated by the position and read of movement of the pointer of the synchroscope and this invention provides mechanism for obtaining continuously and automatically records of successive connections of the machines. In order to do this, the record sheet must be held stationary while a record is being made and must thereafter be advanced a given distance in order to provide a suitable recording surface for the successive operations. This pointer moves on both sides of the zero position with a number of degrees of variation, including direction, amplitude and speed. Each of these qualities is legibly recorded upon the recording surface.

The several drawings illustrating my invention are as follows:

Figure 1 shows in elevation a synchronizing recorder with my improved recording mechanism in place thereon, parts of the structure being broken away to better disclose the operating devices. Fig. 2 is a longitudinal sectional view taken through the roller or spool used to support the unused record strip. Fig. 3 is a detail view of the roller or spool used to receive the portion of the record strip which has been used. Fig. 4 shows in plan view the synchronizer. Fig. 5 is a circuit diagram of the recording and control mechanism. The paper feed magnet shown in Fig. 4 is considered as being joined to the diagram to complete the electrical circuit.

Similar numerals refer to similar parts throughout the several views.

As shown in Fig. 1, the synchronizer is contained within a casing 1, whic supports a rotatable pointer 2, so that its outer end travels over a conducting ring 3, mounted in an insulating disk 4, carried on the face of the synchronizer. The pointer 2 and the ring 3 coöperate, as clearly shown and described in my co-pending application above referred to, to make a record by means of electric sparks in a record sheet disposed between the pointer 2 and the ring 3. The pointer 2 of the synchronizer or synchroscope is movable freely about its axis upon which is mounted a rotatable element acted upon by currents from the two machines to be synchronized, as is well understood in the art.

In the present case the record sheet is formed of a continuous strip 5 of paper or similar material, which, as it passes from the supply spool 6 to the receiving spool 7, is led over the face of the synchronizer between the pointer 2 and the conducting ring 3. The record strip 5 is guided by suitable means so that it will occupy a definite position upon the face of the synchronizer, and at intervals the words "Slow" and "Fast" are printed to indicate whether the machine being thrown into circuit with another machine is running too slow or too fast at the instant that the switch is thrown connecting them together. In addition to the words mentioned, a reference mark 7' is printed on the record strip in connection with each of the designations above mentioned, by means of which the record strip may initially be given a proper adjustment on the face of the synchronizer relatively to the reference finger 8 carried by the casing of the synchronizer. It is to be borne in mind that the operating mechanism of each synchronizer has minor characteristics of its own, requiring a slight difference in the location of the point on the face of the synchronizer which indicates the position of the pointer 2 for perfect synchronism between the electromotive forces impressed upon the circuits of the synchronizing device. The adjusting finger 8 is provided to indicate this particular position of each instrument, and when once adjusted is secured in place by means of the clamping nut 9 and then serves as a reference point to properly adjust all of the records which may be used on the synchronizer.

The supply spool 6, as shown in Fig. 2, is preferably constructed in two parts, 6ª and 6ᵇ, adapted to telescope together, each of which carries one of the flanges of the spool. By this construction the spool may be taken apart and the part 6ª may be slipped through a roll of paper prepared to receive the records and then held in place by putting the part 6ᵇ in position in the part 6ª. A shaft 10 is employed to support the spool and the extending ends of such shaft are held in place in the slots 11, formed in the upper and lower supporting plates 12 of the recording mechanism by means of spring clips 13, which have holes formed in them to engage the ends of the shaft 10. The ends of the shaft are of smaller diameter than the body portion, as a result of which when the parts are in the position described the supporting plates 12 hold the parts of the spool so as to prevent their displacement relatively to each other and the parts of the spool in turn prevent the shaft from becoming displaced in the supporting frame. Each of the springs 13 carries at its outer end a post 14, in which is located a plunger 15, which is held against the corresponding head of the spool 6 by means of a spring 16. The plungers 15 thus serve to prevent free rotation of the spool 6 which keeps the record strip 5 in position upon the guiding surfaces of the recorder frame.

The recording strip 5, after passing over the face of the instrument from the supply spool 6 is engaged by pins 17 carried at each end of a roller 18, which serves the purpose of determining the amount of advance of the record strip for each operation of the synchronizer and also for stopping the driving mechanism at the end of each of said advances. To accomplish this, the roller 18 is made of such a diameter that its circumference is exactly equal to the advance to be imparted to the record strip 5 for each operation of the synchronizer, and on one end of the roller 18 a pin 19 is provided which engages the plunger 20 of an electromagnet 21, such plunger normally being maintained in the path of the pin 19 by a spring 22 by which rotation of the roller 18 is normally prevented. The record strip 5 is provided with equally spaced perforations along its upper and lower edges to engage the pins 17, as a result of which the motion of the record strip is positively controlled by the roller 18. From the roller 18 the record strip passes to the receiving spool 7, the end of the strip being held in engagement therewith by a clamp 7ª provided for the purpose, as shown more clearly in Fig. 3. The receiving spool 7 is supported from the upper and lower frame plates 23 by means of spring clips 24, in a manner similar to the support of the roller 6 from the plates 12. The lower head of the spool 7 has gear teeth cut in its edge, as indicated at 7ᵇ and the gear thus formed meshes with an idler gear 25, which in turn meshes with a gear 26 driven through the pawl 27 and ratchet wheel 28 by means of a spring 29. The ratchet wheel 28 is rigidly secured to the shaft 30, to the upper end of which the winding handle 31 is secured. Thus by rotation of the handle 31 tension is placed upon the spring 29, which by means of the gearing described exerts a tension upon the portion of the record strip between the roller 18 and the receiving spool 7. This serves to advance the record strip an amount equal to one record whenever the plunger 20 of the electromagnet 21 is withdrawn from engagement with the stop pin 19 carried by the roller 18. The strength of the spring 29, however, is not sufficient to injure the record strip when the stop pin 19 engages the plunger 20.

In order that the record strip may be adjusted upon the synchronizer so that the reference points 7' will come exactly in line with the finger 8 for any adjustment of said finger, the solenoid 21 is secured to the upper frame plate 23 by means of screws 32, which extend through slots in the supporting bracket 33 upon which the solenoid 21 is mounted. Thus by undoing the screws 32 the solenoid 21 may be moved so as to impart to the roller 18 the rotation necessary to move the reference points 7 on the record strip one way or the other to bring them in alinement with the finger 8.

In Fig. 4 I have shown diagrammatically a means which may be employed to automatically actuate the solenoid 21 to release the roller 18 for each operation of the synchronizer. Since the system of operation of my recording synchronizer broadly is a part of the invention disclosed in my co-pending application above referred to, said system is not shown in detail here, only sufficient of the circuit connections being shown to indicate the manner of operating the releasing magnet or solenoid 21. In the diagrammatic circuits herein shown the switch 34 represents diagrammatically any means which may be actuated by the operation of the synchronizing mechanism. The pivotal point of the switch 34 is connected by wire 35 with one terminal each of the primary and secondary windings 36 and 37, respectively, of an induction coil. The other terminal of the primary winding 36 is connected with the armature 38 of an interrupter, the contact 39 of which is connected by wire 40 with one of the main battery supply wires 41. The common terminal of the primary and secondary windings is also connected by wire 42 with the pointer 2 of the synchronizer and the other terminal of the secondary winding 37 is connected by wire 43 with the conducting ring 3. The common point of the primary and secondary windings is also connected by wire 44 with one terminal of the solenoid 45, the other terminal of which is connected by wire 46 with the wire 40 and thus with the battery supply wire 41. The other battery supply wire 41ª is connected by wire 47 with the normally open contact 34ª of the switch 34.

The solenoid 45 is provided with a plunger 48 normally held in its outer position by a spring 49. The plunger at its outer end is by a rod 50 of comparatively small diameter connected with but insulated from a conducting bar 51. The ends of the bar 51 are normally disposed immediately below the ends of spring contacts 52 and 53, which ends, as indicated, are provided on their lower surfaces with blocks of insulation 54 and 55. The contact 52 is connected by wire 56 with the battery feed wire 41ª. The contact 53 is connected by wire 57 with one terminal of the solenoid 21, the other terminal of which is connected by wire 58 with the battery feed wire 41. As a result of the construction described, when the solenoid 45 is energized the conducting bar 51 is brought into engagement with the insulating blocks 54 and 55, rotating the spring contacts 52 and 53 upon their pivotal points sufficiently to allow the conducting bar to entirely pass said contacts, without, however, coming into electrical connection with the conducting portions of said contacts. When the solenoid 45 is subsequently deënergized, the plunger 48 is released and under the action of the spring 49 the conducting bar 51 is moved downward and into electrical contact with the conducting portions of the contacts 52 and 53, thus closing the energizing circuit of the solenoid 21, which remains closed until the spring 49 has moved the conducting bar 51 sufficiently downward to pass entirely by the contacts 52 and 53, at which time the energizing circuit of the solenoid 21 is opened. The diameters of the plunger 48 and connecting rod 50 may be so proportioned as to get any desired degree of dashpot action in the solenoid 45 and thus the circuit through the solenoid 21 may be maintained closed as long as desired.

The operation of the mechanism described above is as follows: When the operator actuates the mechanism employed to operate the synchronizer, either directly or indirectly, the switch 34 is closed, either by the same operation or simultaneously by the operator. This energizes the primary winding 36 of the induction coil and by the operation of the interrupter the induced current sent out from the secondary winding 37 is caused to jump from the ring 3 to the pointer 2 at the same instant, thus perforating the record strip 5 and giving a record of the instant of the closure of the switch 34. The vibrating armature 38 breaks the circuit with definite frequency, causing a series of regularly-timed impulses to be generated in the secondary coil. The armature is in effect a tune reed, having a definite frequency, depending upon its physical characteristics, such as length, stiffness, etc. It is to be understood, however, that the frequency is to be great enough to cause the spark punctures on the record to be so close together that the graph or record will closely follow and closely approximate the actual movement of the pointer. This is distinctly different from the prior art devices, which make impressions or take readings at long-time intervals as compared with the time within which changes in the movement of the pointer or indicating element occur. In those devices the resulting curve or line is only a very general average and not a tracing or graph of the actual movement. The spaces of time between sparks in my apparatus may be considered as of very minute value and may be represented mathematically as the infinitesimal quantity $dt$. It is not necessary that the value be strictly infinitesimal, but of such a value only that no marked change in the movement of the pointer with respect to speed, direction, or the like, can occur within that space of time, so that the speed, direction or other variable quality may practically be considered as constant for that short period of time. At the same time the energizing circuit of the solenoid 45 is closed and the conducting bar 51 raised above the spring contacts 52 and 53. The record-making operation may be continued as long as desired, depending upon the particular kind of record it is sought to secure. At the end of the record-making operation the switch 34 is opened, thus deenergizing the solenoid 45, as a result of which the connecting bar 51 engages the contacts 52 and 53 and energizes the solenoid 21. The plunger 20 is thus withdrawn from engagement with the stop pin 18 against the action of the spring 22 and held in such position as long as the connecting bar 51 remains in engagement with the contacts 52 and 53. This affords ample opportunity for the driving spring 29 to advance the record strip so as to move the stop pin 19 beyond the plunger 20 before the latter is released. The operation of the solenoid 45 is so timed that the plunger 20 is released before the roller 18 has made a complete rotation and thus the plunger 20 is in the path of the stop pin 19 when the latter is rotated to its initial position, and in this way but a single rotation of the roller 18 is permitted and the record strip is advanced the amount of a single record, which serves to bring the next printed data into such a position that the reference mark 7' is in proper alinement with the finger 8.

If for any reason it is desired to dispense with the automatic operation of the record-advancing mechanism, the solenoid 21 may be removed from the plate 23 and the receiving spool 7 may be rotated manually by means of the milled head 7ᶜ secured to the lower end of the shaft 7ᵈ, upon which the roller 7 is rigidly mounted.

While I have shown my invention in the particular embodiment herein described, I do not, however, limit myself to this construction, but desire to claim any equivalent that may suggest itself to those skilled in the are.

What I claim is:

1. In combination, an indicating synchroscope having a movable pointer, a paper strip, means for making a record of the movement of said pointer on said strip, means for advancing said strip, time controlled means intermittently governing said advancing means and an electric switch governing in one position the operation of said recording means and governing in another position said time controlled means.

2. In combination, an indicating instrument having a moving pointer, a recording strip, means for making a continuous record of the movement of said pointer on said paper strip, means for advancing said paper strip, an electromagnet governing said advancing means, contacts governing said electromagnet, a controlling circuit, means in said controlling circuit to close said contacts upon deënergization of said circuit, an electric switch for closing said governing circuit and for governing the operation of said recording means.

3. In combination, an indicating synchroscope having a movable pointer, a record strip adjacent said pointer, electrical means for making a continuous record of the movement of said pointer on said strip, spring controlled means for advancing said paper strip, an electromagnet for releasing said spring controlled advancing means, a normally open controlling circuit, a switch for opening said circuit, the closing of said circuit energizing the electrical recording means and opening of said switch energizing said electrical release means.

4. In combination, an indicating instrument having a movable pointer, a dial, a paper strip for recording the movements of said pointer over said dial, means for making a record on said paper strip, means for advancing said record strip, an electromagnet for governing said advancing means, a relay having contacts closed only upon deënergization of said relay, said relay controlling the circuit of said electromagnet, an electric switch controlling the circuit of said means for making a record and of said relay.

5. In combination, an indicating instrument having a movable pointer, a dial, a paper strip for recording the movements of said pointer over said dial, electrical means for making a record on said paper strip, spring controlled means for advancing said record strip, an electromagnet having a detent restraining said spring controlled advancing means, a circuit for said electromagnet, a relay having contacts in said electromagnetic circuit, an armature for said relay, said contacts being operated upon movement of said armature in one direction only, a circuit for said relay and a switch controlling the circuit of said electrical record making means and of said relay.

6. In combination, an indicating instrument having a movable pointer, a dial, a paper strip for recording the movement of said pointer over said dial, electrical means for causing said pointer to record its movement on said strip, means for advancing said strip a definite amount only after a record is made, a time controlled element intermittently governing said advancing means, electrical means controlling said time controlled element and a switch governing the circuit of both said electrical means.

7. In combination, an indicator having a movable indicator member, a dial member, an electrode on said dial, an electrode on said indicator, a relatively stationary record strip between said electrodes, electrical means for passing a current between said electrodes to record the motion of said indicating member over said dial, electrically controlled advancing means for intermittently advancing said strip a definite distance, and a switch causing by its operation successive action only of said recording means and of said advancing means.

8. In a recording mechanism, an indicating instrument having a movable pointer, a record strip adjacent said pointer, spring feed mechanism for said strip, electrical recording means for making a substantially continuous record of the movement of said pointer over said strip, means to energize said electrical recording means, an electromagnet normally restraining said feed mechanism, means to operate said electromagnet temporarily upon deënergization of said electrical recording means.

9. In a recording mechanism, an indicating instrument having a movable pointer, a record strip adjacent said pointer, spring feed mechanism for said strip, electrical recording means for making a continuous record of the movement of said pointer over said strip, a circuit governing said electrical recording means, an electromagnet normally restraining said feed mechanism, a relay governing the circuit of said electromagnet, and a switch controlling the circuit of said electrical recording means and of said relay.

10. In combination, an indicating instrument having a movable pointer, a dial, a record strip adjacent said pointer, electrical means for making a record of the movement of said pointer over said dial on said record strip, feed mechanism for advancing said record strip, a motor for operating said feed mechanism, an electrical circuit governing said motor, a switch having two positions, means operated by moving said switch to one position for energizing said electrical recording means, and means operated by moving said switch to the other position for causing said motor to advance said record strip a predetermined distance.

11. In a recording device, an indicating mechanism having a movable pointer, a recording strip adjacent said pointer, electrical means, said electrical means when energized causing the pointer to record its movement on said record strip, means for advancing said record strip, an electric circuit, a controlling switch in said circuit, said circuit having means to energize said electrical recording means while said switch is closed, and means to operate said record strip advancing means when the switch is opened.

12. In a recording mechanism, a record strip, a supply roll for said strip, a receiving roll, an indicating member having electrical means for making a record on said strip, an electromagnet energized to advance said record strip to a new recording position, a switch governing said electrical recording means to energize the same when said switch is closed and controlling said electromagnet to energize the same when said switch is opened.

13. In a recorder, the combination of a supply roll for a record strip, a receiving roll, driving means tending to rotate the receiving roll, a stop for normally preventing rotation of the receiving roll, electrically controlled means for making a record on said strip, an electromagnet for removing the stop to permit rotation of the receiving roll, and means for automatically energizing the electromagnet at the end of the recording operation.

14. In a recorder, the combination of a supply roll for a record strip, a receiving roll, driving means tending to rotate the receiving roll, a measuring roller engaged by the record strip, a stop normally in engagement with the measuring roller to prevent its rotation, electrically controlled means for making a record on said strip, an electromagnet for momentarily withdrawing the stop to permit a single rotation of the measuring roller, and means for automatically energizing the electromagnet at the end of the recording operation.

15. In combination, a recording instrument having a radial pointer, a dial, said radial pointer angularly movable over said dial, a normally stationary record strip having its axis at right angles to the zero or reference position of the pointer, means for recording the angular movements of said pointer on both sides of said reference position by registering a plurality of instantaneous positions of said pointer, and means for intermittently advancing said record strip in the line of its axis.

16. In combination, an indicating instrument having a dial, a radial pointer angularly movable over said dial, a record strip movable over a segment of said dial, means for recording the movement of said pointer over said dial by registering a plurality of instantaneous positions of said pointer, and means for preventing movement of said record strip while said recording means is active.

17. In combination, an indicating instrument having a dial, a radial pointer angularly movable over said dial, a recording strip movable over a segment of said dial, said strip having its axis of movement at right angles to the zero or reference position of the pointer, means for recording the angular movement of said pointer on both sides of said reference position, means to advance said paper strip, detent means restraining said advancing means, a switch to energize said recording means, and means to disengage said detent means after the energization of said recording means.

18. In combination an indicating instrument having a movable pointer, a paper strip divided into a plurality of record surfaces, means for making a plurality of instantaneous records of the instantaneous position of said pointer, manually controlled means for causing operation of said recording means for a variable length of time and means controlled by the cessation of operation of said recording means for feeding forward a fresh record surface of paper.

19. In combination an indicating instrument having a dial, said dial having a recording portion, a movable pointer for the dial, a paper strip divided into a plurality of record surfaces, each surface adapted to cover the recording portion of the dial, means for passing sparks between said pointer and said dial for making a plurality of instantaneous records of the instantaneous position of said pointer, manually controlled means for causing the operation of said spark means and means controlled by the cessation of operation of said spark means for feeding forward a fresh recording portion of said paper strip.

20. An indicator having a movable pointer, a paper strip for recording the movement of said pointer, means for generating a series of electric sparks for puncturing said strip to give a record of the instantaneous positions of the movable pointer, means operable only after operation of said recording means for advancing said paper strip a predetermined amount and a switch controlling said recording means and said advancing means to cause operation of said recording means and thereafter operation of said record advancing means.

21. In combination, an indicating instrument having a pointer movable in a single linear path with two degrees of variation, a relatively stationary recording surface and means for making records of the instantaneous position of said pointer at regularly timed intervals thus recording one degree of variation by the length of the graph and another degree of variation by intensity of the graph.

22. In combination, an indicating instrument having a pointer movable in a single linear path with three degrees of variation, viz; direction, speed and amplitude, a relatively stationary recording surface having a zero indication thereon, means for making an impression of the instantaneous position of the pointer at regularly timed intervals, thereby recording one degree of variation by the position of the line, another degree of variation by the intensity of the line and another degree of variation by the length of the line.

23. In combination, an indication instrument having a pointer movable in a single linear path with a plurality of degrees of variation, said degrees of variation comprising speed, distance and direction, a stationary recording surface, an electrode carried by said pointer over said recording surface and means to pass a spark from said electrode through said record sheet at regularly timed intervals in order to record said plurality of degrees of variation.

In witness whereof, I hereunto subscribe my name this 7th day of August, A. D. 1911.

EDMUND O. SCHWEITZER.

Witnesses:
 FRED K. SMITH,
 SAM B. DONABERGER.